US010145425B2

United States Patent
Smith et al.

(10) Patent No.: US 10,145,425 B2
(45) Date of Patent: Dec. 4, 2018

(54) CLUTCH CARRIER ASSEMBLY

(71) Applicant: Schaeffler Technologies AG & Co. KG, Herzogenaurach (DE)

(72) Inventors: David Smith, Wadsworth, OH (US); Michael Hodge, Creston, OH (US); Daniel Linton, North Canton, OH (US); Gregory Heeke, Wooster, OH (US); Matthew Frary, Burbank, OH (US)

(73) Assignee: SCHAEFFLER TECHNOLOGIES AG & CO. KG, Herzogenaurach (DE)

( * ) Notice: Subject to any disclaimer, the term of this patent is extended or adjusted under 35 U.S.C. 154(b) by 233 days.

(21) Appl. No.: 15/146,014

(22) Filed: May 4, 2016

(65) Prior Publication Data
US 2016/0333944 A1    Nov. 17, 2016

Related U.S. Application Data

(60) Provisional application No. 62/160,332, filed on May 12, 2015.

(51) Int. Cl.
*F16D 13/52* (2006.01)
*F16D 13/68* (2006.01)
(Continued)

(52) U.S. Cl.
CPC .......... *F16D 13/683* (2013.01); *F16D 13/52* (2013.01); *F16D 13/644* (2013.01); *F16D 21/06* (2013.01);
(Continued)

(58) Field of Classification Search
CPC ........ F16D 13/52; F16D 13/58; F16D 13/644; F16D 21/06; F16D 2021/0661;
(Continued)

(56) References Cited

U.S. PATENT DOCUMENTS 5,388,474 A * 2/1995 Tanaka et al. ......... B21D 53/28
 192/70.2
5,732,810 A * 3/1998 Schulz-Andres ....... F16D 13/70
 192/30 W (Continued)

FOREIGN PATENT DOCUMENTS

CN    103620251 A    3/2014

OTHER PUBLICATIONS

International Search Report and Opinion for PCT/US2016/030675; 9 pgs; dated Aug. 29, 2016 by Korean Intellectual Property Office.

*Primary Examiner* — Richard M Lorence
(74) *Attorney, Agent, or Firm* — LeKeisha M. Suggs

(57) ABSTRACT

A clutch carrier includes a stamped carrier and a hub portion. The stamped carrier has a first circumferential wall, a second circumferential wall axially and radially offset from the first circumferential wall, and a first radial wall extending radially inward from the second circumferential wall. The hub portion has a third circumferential wall extending from the first radial wall, a fourth circumferential wall axially and radially offset from the third circumferential wall, and a second radial wall connecting the third and fourth circumferential walls. In some example embodiments, the first circumferential wall includes a plurality of axially extending fingers for driving engagement with a clutch plate. In an example embodiment, each of the plurality of axially extending fingers includes a groove for receiving a retaining ring.

17 Claims, 8 Drawing Sheets

(51) Int. Cl.
*F16D 25/0638* (2006.01)
*F16D 13/64* (2006.01)
*F16D 21/06* (2006.01)

(52) U.S. Cl.
CPC .. *F16D 25/0638* (2013.01); *F16D 2021/0661* (2013.01); *F16D 2300/12* (2013.01)

(58) Field of Classification Search
CPC .. F16D 25/0638; F16D 25/12; F16D 2300/18; F16D 2300/26; F16D 13/683
USPC .................................................. 192/48.619
See application file for complete search history.

(56) References Cited

U.S. PATENT DOCUMENTS

| | | | |
|---|---|---|---|
| 7,147,092 B2 * | 12/2006 | Friedmann | F16D 21/06 192/48.91 |
| 7,247,114 B2 * | 7/2007 | Kaneda et al. | F16H 59/42 192/30 W |
| 7,954,615 B2 | 6/2011 | Tiesler et al. | |
| 8,790,212 B2 | 7/2014 | Davis et al. | |
| 8,961,359 B2 | 2/2015 | Floro et al. | |
| 2003/0087720 A1 * | 5/2003 | Lepelletier | F16H 3/663 475/282 |
| 2006/0287152 A1 | 12/2006 | Bishop et al. | |
| 2007/0193848 A1 | 8/2007 | Uhler et al. | |
| 2012/0267211 A1 | 10/2012 | Noehl et al. | |
| 2013/0256080 A1 | 10/2013 | Luipold | |

* cited by examiner

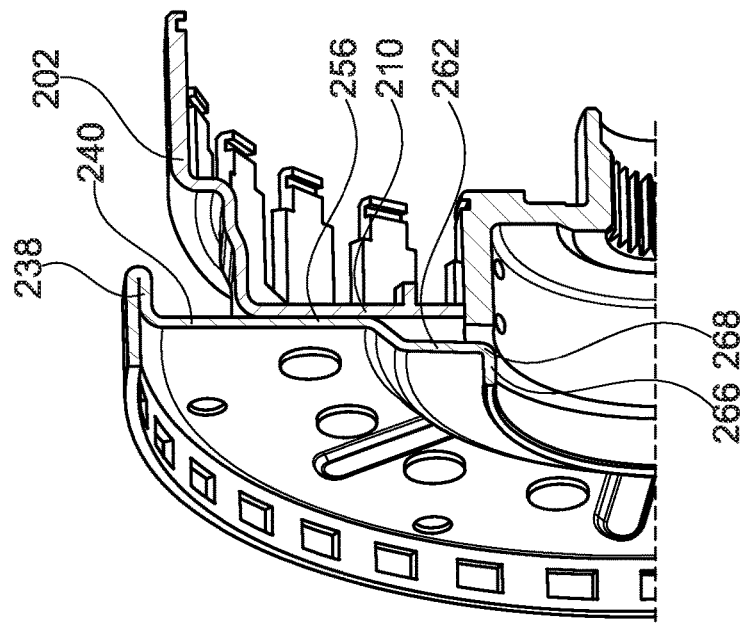
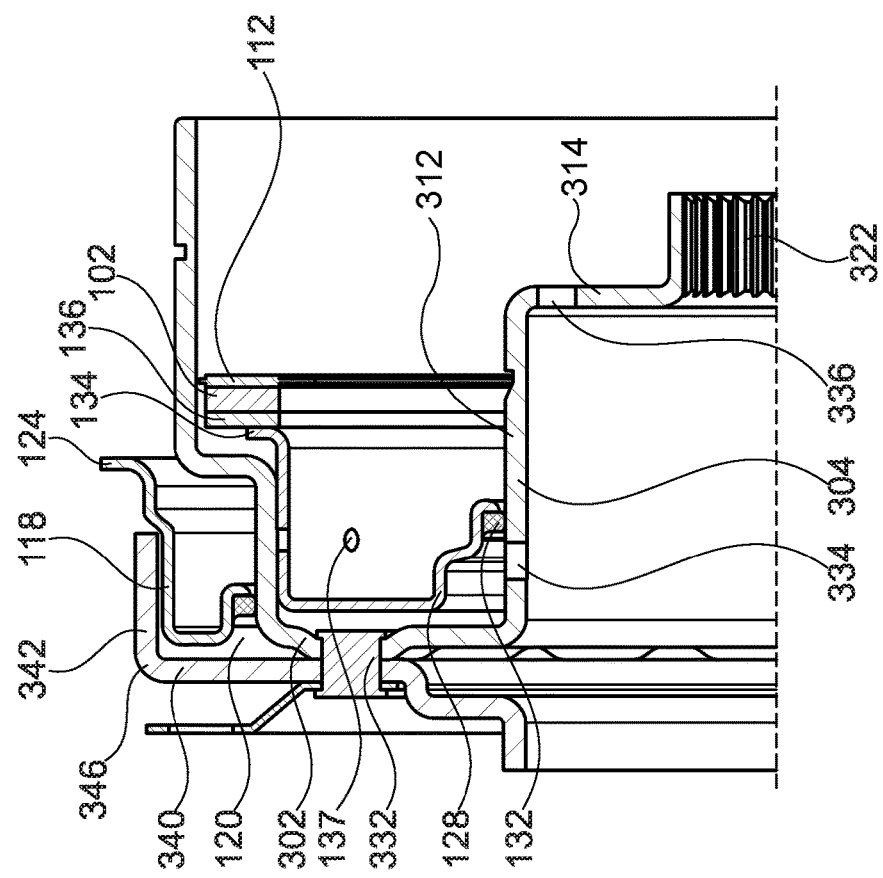

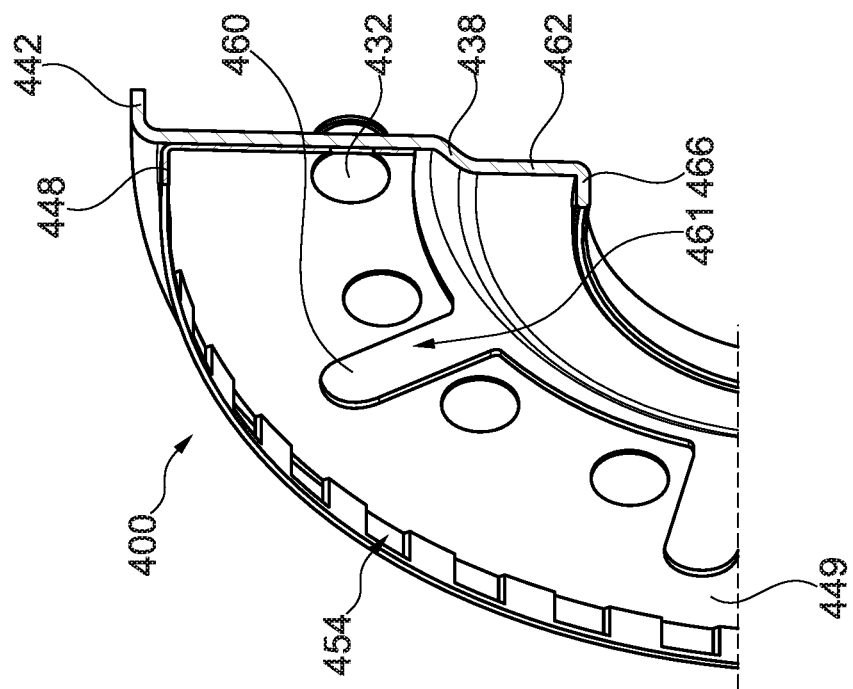
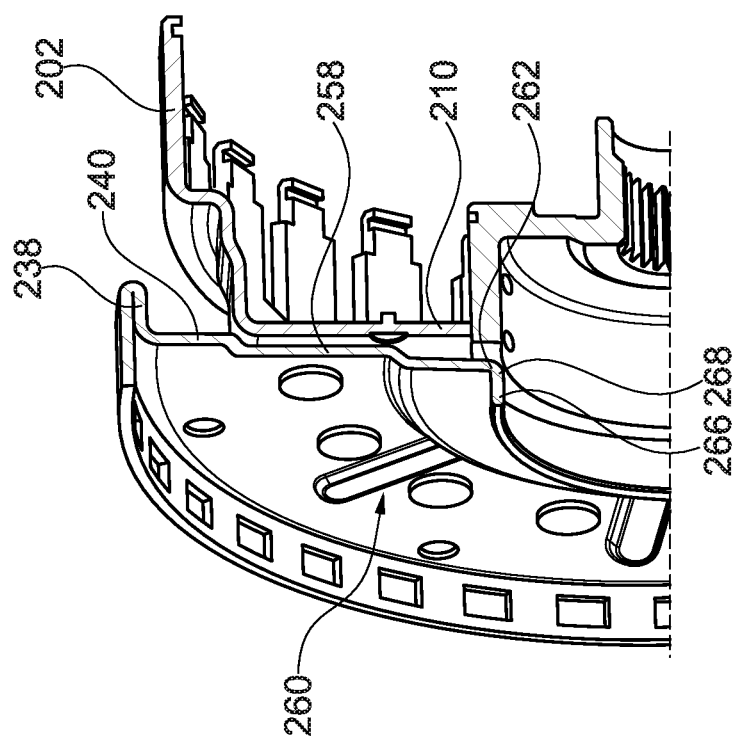

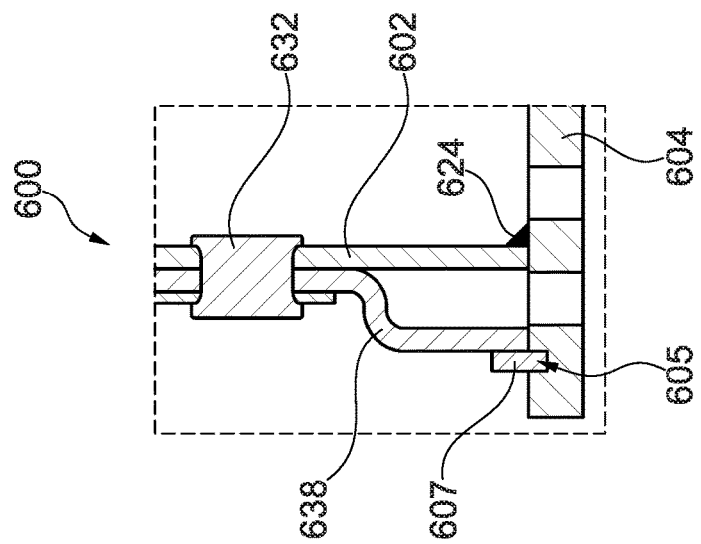
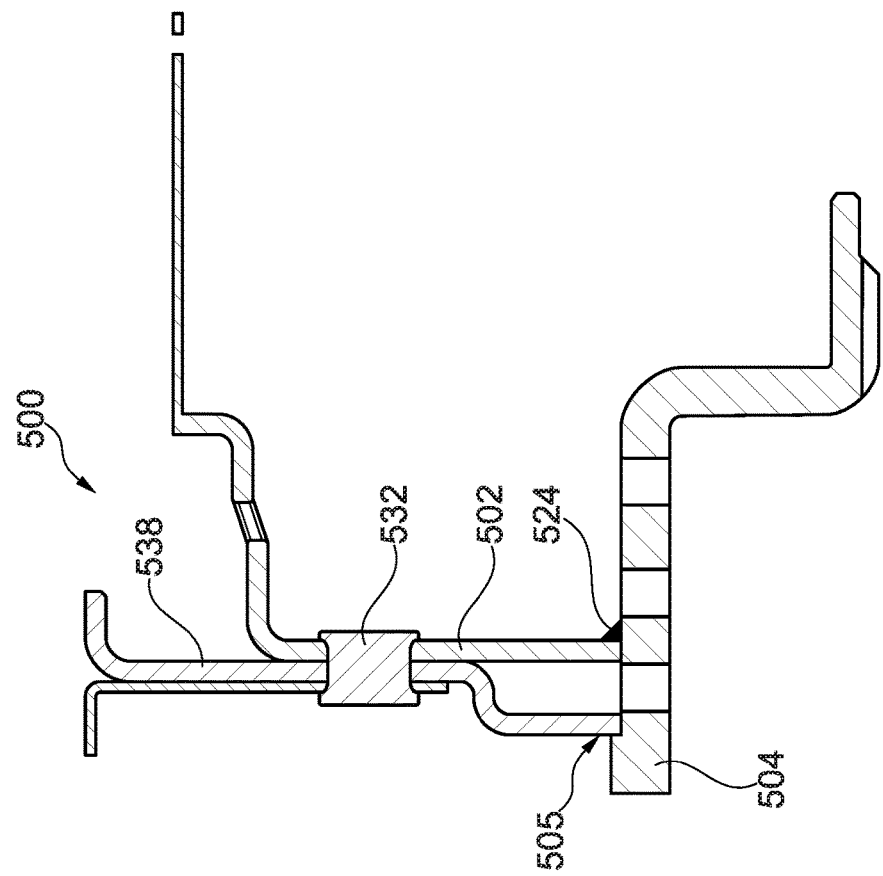
Fig. 11
Fig. 10

CLUTCH CARRIER ASSEMBLY

FIELD

The invention relates generally to a clutch carrier assembly for a transmission clutch pack assembly.

BACKGROUND

Clutch assemblies for transmissions are known. One example is shown in commonly assigned U.S. Pat. No. 8,790,212 to Davis et al. Another example is shown in U.S. Pat. No. 8,961,359 to Floro et al.

BRIEF SUMMARY

Example aspects broadly comprise a clutch carrier including a stamped carrier and a hub portion. The stamped carrier has a first circumferential wall, a second circumferential wall axially and radially offset from the first circumferential wall, and a first radial wall extending radially inward from the second circumferential wall. The hub portion has a third circumferential wall extending from the first radial wall, a fourth circumferential wall axially and radially offset from the third circumferential wall, and a second radial wall connecting the third and fourth circumferential walls. In some example embodiments, the first circumferential wall includes a plurality of axially extending fingers for driving engagement with a clutch plate. In an example embodiment, each of the plurality of axially extending fingers includes a groove for receiving a retaining ring.

In an example embodiment, the fourth circumferential wall includes a spline for driving engagement with a transmission shaft. In an example embodiment, the third circumferential wall is fixed to the first radial wall by welding. In an example embodiment, the third circumferential wall is drivingly engaged with the first radial wall by a spline connection. In an example embodiment, the carrier has a conical portion extending from the second circumferential wall and including a plurality of circumferentially offset flow holes. In an example embodiment, the first radial wall includes a plurality of holes for receiving a respective plurality of rivets. In an example embodiment, the third circumferential wall includes pluralities of axially offset flow holes. In some example embodiments, the carrier and the hub are integrally formed out of a single piece of sheet metal. In an example embodiment, the third circumferential wall and the second radial wall include respective pluralities of flow holes.

Other example aspects broadly comprise a clutch carrier assembly for a transmission including a clutch carrier including a first radial wall, a cover fixed to the clutch carrier, and a hub drivingly engaged with the clutch carrier or the cover. The cover has a second radial wall with a first portion in contact with the first radial wall and a second portion including a plurality of circumferentially offset radial depressions. The cover has a third radial wall radially and axially offset from the second radial wall and axially offset from the first radial wall and a first cylindrical protrusion extending from a radially outermost portion of the second radial wall. In some example embodiments, the clutch carrier assembly has a plurality of rivets circumferentially offset from the radial depressions for fixing the clutch carrier to the cover.

In an example embodiment, the cover includes a cylindrical protrusion extending from a radially inner most portion of the third radial wall and the clutch carrier is fixed to the hub by welding. In an example embodiment, the clutch carrier assembly has a speed sensor wheel including a plurality of radial notches for receiving the radial depressions and fixed to the clutch carrier and the cover by the plurality of rivets. In an example embodiment, the hub includes a shoulder or a notch, the cover is axially retained by the shoulder or a retaining ring disposed in the notch, and the clutch carrier is fixed to the hub by welding. In an example embodiment, the hub includes a notch, a shoulder, and a spline, the clutch carrier is axially retained by the shoulder and drivingly engaged with the hub by the spline, and the cover is axially retained by a retaining ring disposed in the notch. In an example embodiment, the hub includes a shoulder, the clutch carrier is axially retained by the shoulder, and the cover is fixed to the hub by welding.

Other example aspects broadly comprise a radial wall, a first cylindrical protrusion extending in a first axial direction from a radially outermost portion of the radial wall, a second cylindrical protrusion extending in a second axial direction, opposite the first axial direction, from a distal end of the first cylindrical protrusion and at least partially in contact with the first cylindrical protrusion. In some example embodiments, the second cylindrical protrusion comprises a plurality of circumferentially spaced and radially extending apertures. In an example embodiment, the apertures are rectangular in shape.

BRIEF DESCRIPTION OF THE DRAWINGS

The nature and mode of operation of the present invention will now be more fully described in the following detailed description taken with the accompanying drawing figures, in which:

FIG. 6 is a top half cross section view of a portion of the clutch carrier assembly of FIG. 4 depicting an alternative embodiment;

FIG. 7 is a sectioned perspective front view of a portion of the clutch carrier assembly of FIG. 3 showing a riveted connection;

FIG. 8 is a sectioned perspective front view of a portion of the clutch carrier assembly of FIG. 3 showing a flow channel;

FIG. 9 is a sectioned perspective front view of a cover showing an alternative embodiment with a speed sensor wheel;

FIG. 10 is a top half cross section view of a portion of the clutch carrier assembly of FIG. 7 showing an alternative embodiment;

FIG. 11 is a partial cross section view of a portion of the clutch carrier assembly of FIG. 9 showing an alternative embodiment;

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 2:
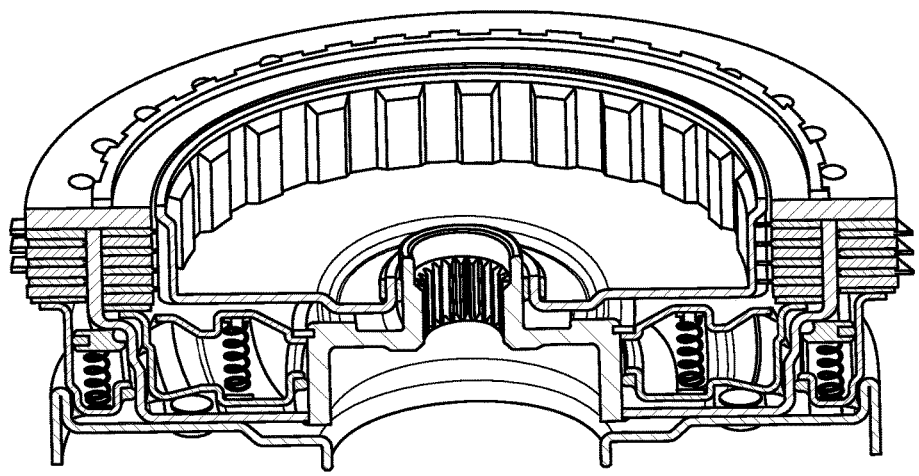
FIG. 2 is a sectioned perspective back view of the clutch pack assembly of FIG. 1.
Figure 1:
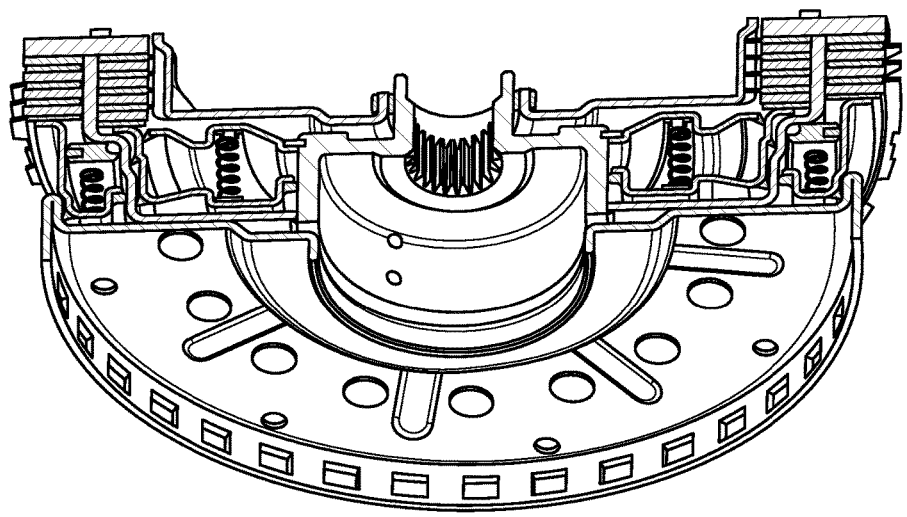
FIG. 1 is a sectioned perspective front view of a clutch pack assembly according to an example embodiment.
Figure 3:
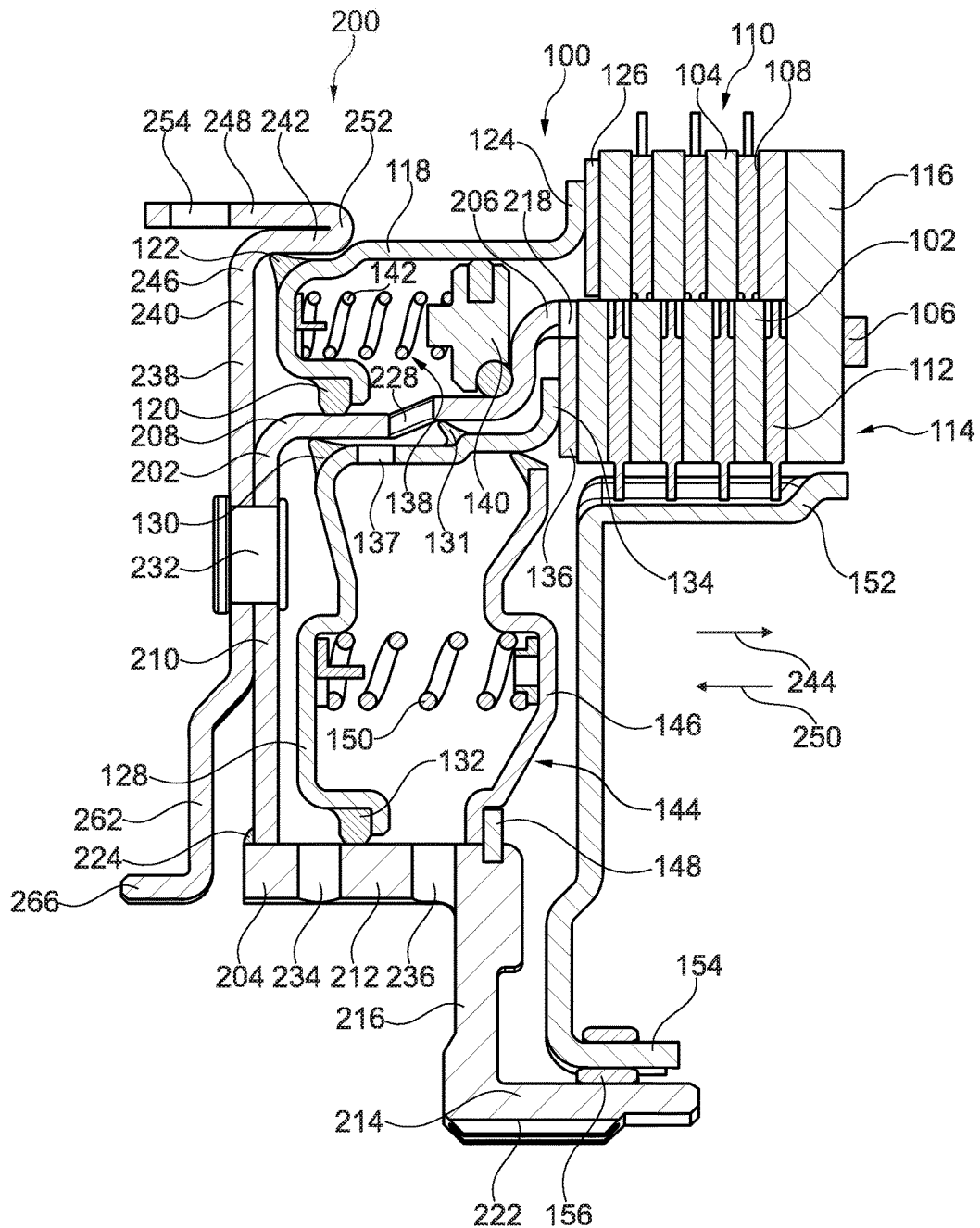
FIG. 3 is a top half cross section view of the clutch pack assembly of FIG. 1.

The following description is made with reference to FIGS. 1-3. FIG. 1 is a sectioned perspective front view of clutch pack assembly 100 according to an example embodiment. FIG. 2 is a sectioned perspective back view of clutch pack assembly 100 of FIG. 1. FIG. 3 is a top half cross section view of clutch pack assembly 100 of FIG. 1. Clutch carrier assembly 200 is for a transmission (not shown). Clutch carrier assembly 200 includes stamped carrier 202 and hub portion 204. Carrier 202 includes circumferential wall 206, circumferential wall 208 axially and radially offset from the circumferential wall 206, and radial wall 210 extending radially inward from circumferential wall 208. Hub portion 204 includes hub portion circumferential wall 212 extending from radial wall 210, circumferential wall 214 axially and radially offset from the circumferential wall 212, and radial wall 216 connecting the circumferential walls 212 and 214.

Figure 5:
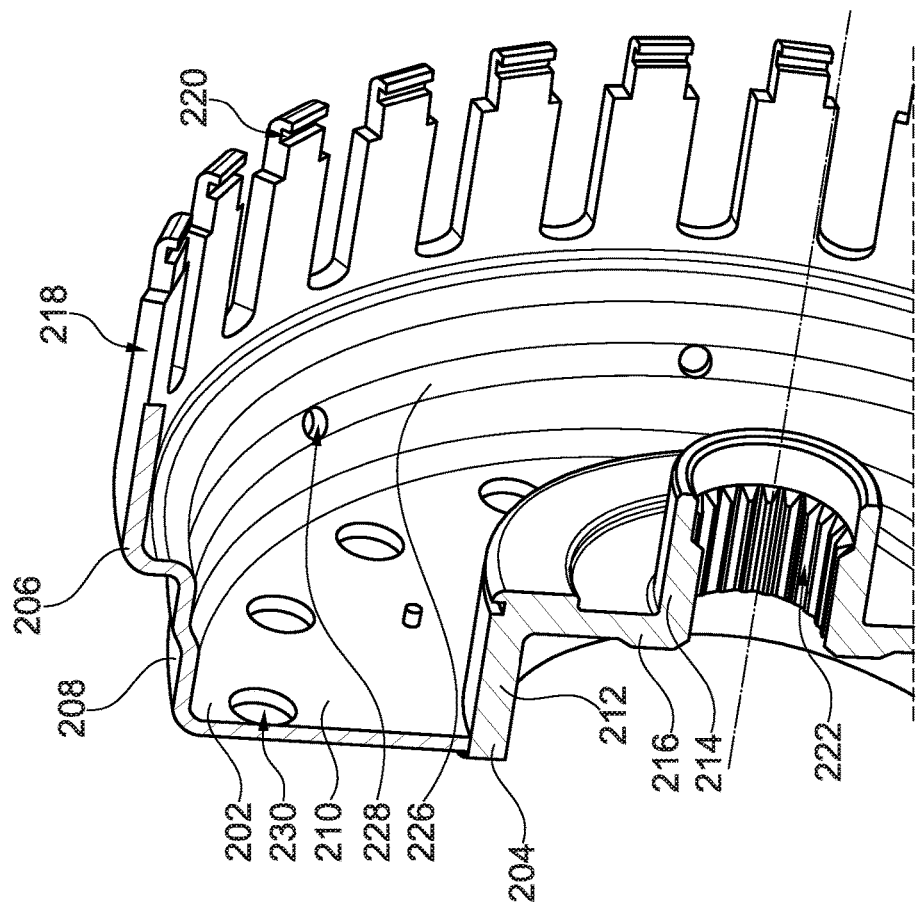
FIG. 5 is a sectioned perspective back view of the portion of the clutch carrier assembly of FIG. 4.
Figure 4:
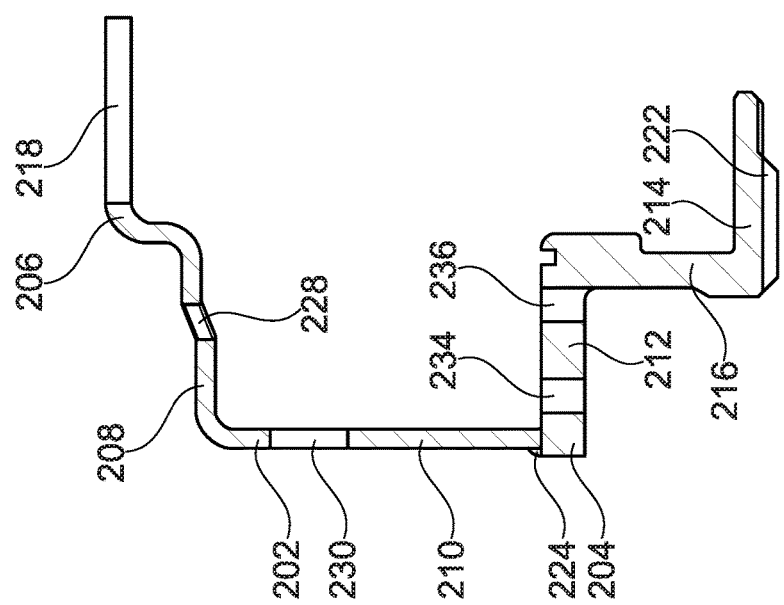
FIG. 4 is a top half cross section view of a portion of a clutch carrier assembly for the clutch pack assembly of FIG. 3.

The following description is made with reference to FIGS. 1-5. FIG. 4 is a top half cross section view of a portion of clutch carrier assembly 200 for clutch pack assembly 100 of FIG. 3. FIG. 5 is a sectioned perspective back view of the portion of clutch carrier assembly 200 of FIG. 4. Circumferential wall 206 includes a plurality of axially extending fingers 218 for driving engagement with respective pluralities of clutch plates 102 and 104. Each of the plurality of axially extending fingers includes groove 220 for receiving retaining ring 106. Circumferential wall 214 includes spline 222 for driving engagement with a transmission shaft (not shown). Circumferential wall 212 is fixed to radial wall 210 by weld 224.

Carrier 202 includes conical portion 226 extending from circumferential wall 208. Portion 226 includes a plurality of circumferentially offset flow holes 228. Radial wall 210 includes a plurality of holes 230 for receiving a respective plurality of rivets 232. Circumferential wall 212 includes pluralities of axially offset flow holes 234 and 236.

Figure 14:
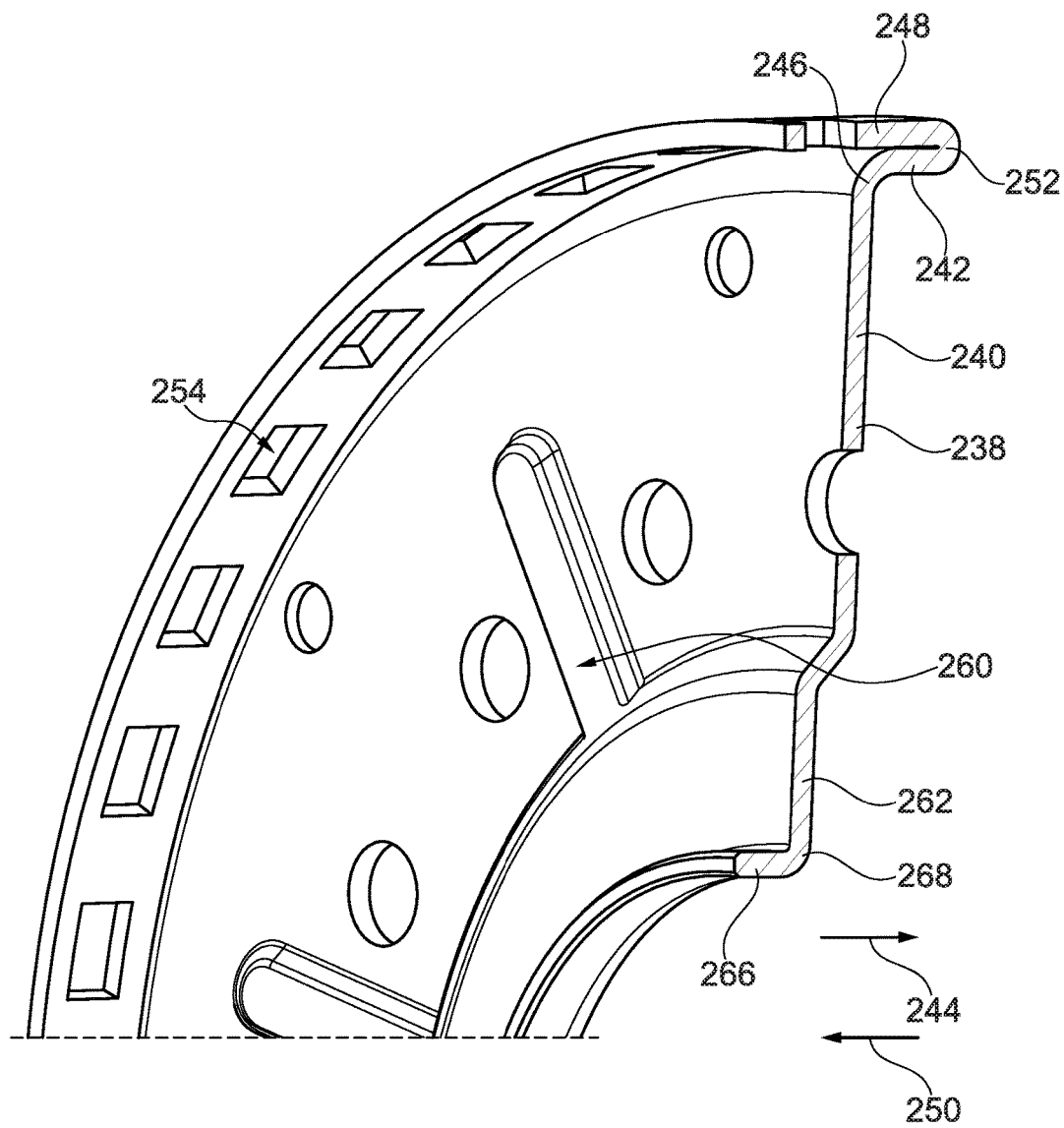
FIG. 14 is a sectioned perspective front view of a cover of the clutch pack assembly of FIG. 1.

Clutch carrier assembly 200 further includes cover 238 fixed to carrier 202 by rivets 232. Cover 238 includes radial wall 240, cylindrical protrusion 242 extending in axial direction 244 from radially outermost portion 246 of the radial wall and cylindrical protrusion 248 extending in axial direction 250, opposite axial direction 244, from distal end 252 of cylindrical protrusion 242 and at least partially in contact with cylindrical protrusion 242. Cylindrical protrusion 248 includes a plurality of circumferentially spaced and radially extending apertures 254. Apertures 254 are rectangular in shape (ref. FIG. 14).

Clutch pack assembly 100 further includes clutch plates 108 interspaced with clutch plates 104 to form clutch 110, and clutch plates 112 interspaced with clutch plates 102 to form clutch 114. Backing plate 116 is disposed between clutches 110 and 114, and retaining ring 106. Piston 118 is sealed to carrier 202 and cover 238 via seals 120 and 122, respectively. Piston 118 includes radial wall 124 for engaging apply plate 126 to compress clutch 110. Piston 128 is sealed to carrier 202 via seals 130 and 131, and hub 204 via seal 132. Piston 128 includes radial wall 134 for engaging apply plate 136 to compress clutch 112 and circumferentially spaced flow holes 137.

Sealed release assembly 138 includes sealing ring 140 and spring 142. Sealed release assembly 144 includes sealing ring 146, retained on hub 204 by retaining ring 148, and spring 150. Clutch carrier 152 is engaged with clutch plates 112 and includes cylindrical portion 154 with bushing 156 for positioning on hub cylindrical wall 214.

The following description is made with reference to FIG. 6. FIG. 6 is a top half cross section view of a portion of a clutch carrier assembly depicting alternative embodiment 300 of clutch carrier assembly 200 of FIG. 4. All 3XX reference numbers generally refer to 2XX reference numbers described above except as described below. Carrier 302 and hub 304 are integrally formed out of a single piece of sheet metal. Circumferential wall 312 and radial wall 314 include respective pluralities of flow holes 334 and 336. Circumferential wall 314 includes spline 322 for driving engagement with a transmission shaft (not shown). Rivets 332 fix radial wall 340 to carrier 302. Cylindrical protrusion 342 extends from radially outermost portion 346 of radial wall 340.

The following description is made with reference to FIGS. 7-8. FIG. 7 is a sectioned perspective front view of a portion of clutch carrier assembly 200 of FIG. 3 showing a riveted connection. FIG. 8 is a sectioned perspective front view of a portion of clutch carrier assembly 200 of FIG. 3 showing a flow channel. Cover 238 is fixed to clutch carrier 202. Cover 238 includes radial wall 240 with portion 256 in contact with radial wall 210 (ref. FIG. 7) and portion 258 with circumferentially offset radial depressions 260 (ref. FIG. 8). Radial depressions 260 extend beyond a radially outermost portion of wall 210 and to a radially innnermost portion of wall 240, forming a radial flow channel between carrier 202 and cover 238. Cover 238 includes radial wall 262 radially and axially offset from radial wall 240 and axially offset from radial wall 210. Hub 204 is drivingly engaged with clutch carrier 202.

Clutch carrier assembly 200 includes rivets 232 circumferentially offset from the radial depressions for fixing the clutch carrier to the cover. Cover 238 includes cylindrical protrusion 266 extending from radially inner most portion 268 of radial wall 260.

The following description is made with reference to FIG. 9. FIG. 9 is a sectioned perspective front view of cover 400 showing an alternative embodiment with speed sensor wheel 449. All 4XX reference numbers generally refer to 2XX reference numbers described above except as described below. Speed sensor wheel 449 includes a plurality of radial notches 461 for receiving radial depressions 460. Wheel 449 is fixed to the clutch carrier (not shown) and cover 438 by a plurality of rivets 432. Cover 438 includes cylindrical protrusion 442 with a plurality of circumferentially spaced and radially extending apertures 454. Cover 438 includes radial wall 462 and cylindrical protrusion 466.

The following description is made with reference to FIG. 10. FIG. 10 is a top half cross section view of a portion of clutch carrier assembly 200 of FIG. 7 showing alternative embodiment 500. All 5XX reference numbers generally refer to 2XX reference numbers described above except as described below. Hub 504 includes shoulder 505. Cover 538 is axially retained by the shoulder. Clutch carrier 502 is fixed to hub 504 by weld 524. Embodiment 500 includes rivet 532.

The following description is made with reference to FIG. 11. FIG. 10 is a top half cross section view of a portion of clutch carrier assembly 200 of FIG. 7 showing alternative embodiment 600. All 6XX reference numbers generally refer to 2XX reference numbers described above except as described below. Hub 604 includes notch 605. Cover 638 is axially retained by retaining ring 607 disposed in notch 605. Clutch carrier 602 is fixed to hub 604 by weld 624. Embodiment 600 includes rivet 632.

Figure 12:
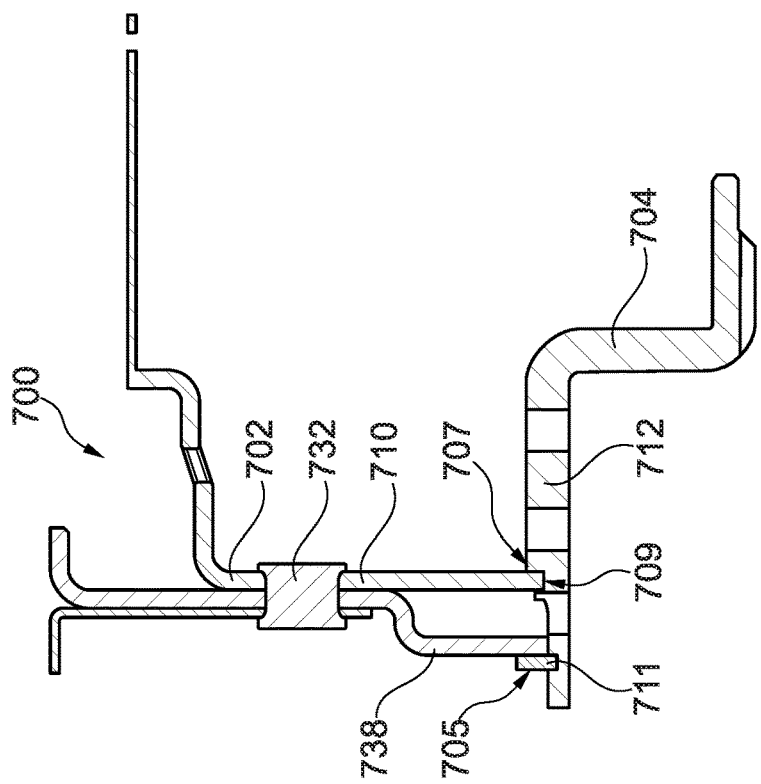
FIG. 12 is a top half cross section view of a portion of the clutch carrier assembly of FIG. 7 showing an alternative embodiment.

The following description is made with reference to FIG. 12. FIG. 12 is a top half cross section view of a portion of clutch carrier assembly 200 of FIG. 7 showing alternative embodiment 700. All 7XX reference numbers generally refer to 2XX reference numbers described above except as described below. Hub 704 includes notch 705, shoulder 707, and spline 709. Clutch carrier 702 is axially retained by shoulder 707 and drivingly engaged with hub 704 by spline 709. In other words, circumferential wall 712 is drivingly engaged with radial wall 710 by a spline connection. Cover 738 is axially retained by retaining ring 711 disposed in notch 705. Embodiment 700 includes rivet 732.

Figure 13:
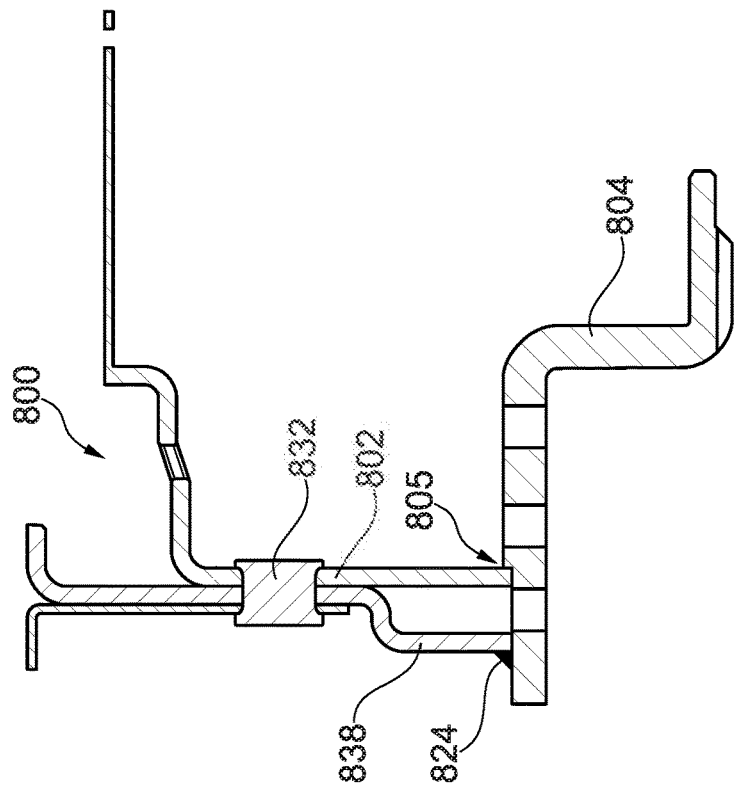
FIG. 13 is a top half cross section view of a portion of the clutch carrier assembly of FIG. 7 showing an alternative embodiment.

The following description is made with reference to FIG. 13. FIG. 13 is a top half cross section view of a portion of clutch carrier assembly 200 of FIG. 7 showing alternative embodiment 800. All 8XX reference numbers generally refer to 2XX reference numbers described above except as described below. Hub 804 includes shoulder 805. Clutch carrier 802 is axially retained by shoulder 805. Cover 838 is fixed to hub 804 by weld 824. In other words, hub 804 is drivingly engaged with cover 838. Embodiment 800 includes rivet 832.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch carrier assembly for a transmission comprising:
   a stamped carrier comprising:
      a first circumferential wall;
      a second circumferential wall axially and radially offset from the first circumferential wall; and,
      a first radial wall extending radially inward from the second circumferential wall, the first radial wall including a plurality of holes for receiving a respective plurality of rivets; and,
   a hub portion comprising:
      a third circumferential wall extending from the first radial wall;
      a fourth circumferential wall axially and radially offset from the third circumferential wall; and,
      a second radial wall connecting the third and fourth circumferential walls.

2. The clutch carrier assembly of claim 1 wherein the first circumferential wall includes a plurality of axially extending fingers for driving engagement with a clutch plate.

3. The clutch carrier assembly of claim 2 wherein each of the plurality of axially extending fingers includes a groove for receiving a retaining ring.

4. The clutch carrier assembly of claim 1 wherein the fourth circumferential wall includes a spline for driving engagement with a transmission shaft.

5. The clutch carrier assembly of claim 1 wherein the third circumferential wall is fixed to the first radial wall by welding.

6. The clutch carrier assembly of claim 1 wherein the third circumferential wall is drivingly engaged with the first radial wall by a spline connection.

7. The clutch carrier assembly of claim 1 wherein the carrier comprises a conical portion extending from the second circumferential wall and including a plurality of circumferentially offset flow holes.

8. The clutch carrier assembly of claim 1 wherein the third circumferential wall includes pluralities of axially offset flow holes.

9. The clutch carrier assembly of claim 1 wherein the carrier and the hub are integrally formed out of a single piece of sheet metal.

10. The clutch carrier assembly of claim 9 wherein the third circumferential wall and the second radial wall include respective pluralities of flow holes.

11. A clutch carrier assembly for a transmission comprising:
   a clutch carrier including a first radial wall;
   a cover fixed to the clutch carrier and including:
      a second radial wall including:
         a first portion in contact with the first radial wall; and,
         a second portion including a plurality of circumferentially offset radial depressions;
      a third radial wall radially and axially offset from the second radial wall and axially offset from the first radial wall; and,
      a first cylindrical protrusion extending from a radially outermost portion of the second radial wall; and,
   a hub drivingly engaged with the clutch carrier or the cover.

12. The clutch carrier assembly of claim 11 further comprising a plurality of rivets circumferentially offset from the radial depressions for fixing the clutch carrier to the cover.

13. The clutch carrier assembly of claim 12 wherein:
   the cover includes a cylindrical protrusion extending from a radially inner most portion of the third radial wall; and,
   the clutch carrier is fixed to the hub by welding.

14. The clutch carrier assembly of claim 12 further comprising a speed sensor wheel including a plurality of radial notches for receiving the radial depressions and fixed to the clutch carrier and the cover by the plurality of rivets.

15. The clutch carrier assembly of claim 12 wherein:
   the hub includes a shoulder or a notch;
   the cover is axially retained by the shoulder or a retaining ring disposed in the notch; and,
   the clutch carrier is fixed to the hub by welding.

16. The clutch carrier assembly of claim 12 wherein:
   the hub includes a notch, a shoulder, and a spline;

the clutch carrier is axially retained by the shoulder and drivingly engaged with the hub by the spline; and,
the cover is axially retained by a retaining ring disposed in the notch.

17. The clutch carrier assembly of claim 12 wherein:
the hub includes a shoulder;
the clutch carrier is axially retained by the shoulder; and,
the cover is fixed to the hub by welding.

\* \* \* \* \*